United States Patent [19]
Licht et al.

[11] Patent Number: 5,342,915
[45] Date of Patent: Aug. 30, 1994

[54] AQUEOUS POLYURETHANE DISPERSIONS

[75] Inventors: Ulrike Licht, Mannheim; Karl Haeberle, Neustadt; Erich Gulbins, Heidelberg; Maria G. Rau, Bad Durkheim; Gernot Franzmann, Bobenheim; Michael Portugall, Wachenheim, all of Fed. Rep. of Germany

[73] Assignee: BASF Aktiengesellschaft, Ludwigshafen, Fed. Rep. of Germany

[21] Appl. No.: 987,602

[22] Filed: Dec. 9, 1992

[30] Foreign Application Priority Data

Dec. 9, 1991 [DE] Fed. Rep. of Germany ........ 4140486

[51] Int. Cl.$^5$ .................... C08G 18/28; C08G 18/70
[52] U.S. Cl. ........................................ 528/71; 528/44; 528/59; 528/61; 528/62; 528/64; 524/531; 524/589; 524/590; 524/591
[58] Field of Search ............... 528/44, 59, 61, 62, 528/64, 71; 524/531, 589, 590, 591

[56] References Cited

U.S. PATENT DOCUMENTS

| 4,268,426 | 5/1981 | Williams et al. | 528/75 |
| 4,329,490 | 5/1982 | Williams et al. | |
| 5,135,963 | 8/1992 | Haeberle | 524/591 |

FOREIGN PATENT DOCUMENTS

| 0000171 | 1/1979 | European Pat. Off. |
| 0018665 | 11/1990 | European Pat. Off. |
| 1237306 | 3/1967 | Fed. Rep. of Germany |
| 2528212 | 1/1977 | Fed. Rep. of Germany |
| 3437918 | 4/1986 | Fed. Rep. of Germany |
| 2098341 | 3/1972 | France |

OTHER PUBLICATIONS

Chemical Abstracts, vol. 83, No. 14, Oct. 1975, AN–115785r, Hosokawa, et al., "Water-Soluble Polyurethanes".

*Primary Examiner*—John Kight, III
*Assistant Examiner*—Duc Truong
*Attorney, Agent, or Firm*—Oblon, Spivak, McClelland, Maier & Neustadt

[57] ABSTRACT

Aqueous dispersions contain a polyurethane which consists essentially of
a) organic polyisocyanates and, if required, minor amounts of monoisocyanates,
b) dihydroxy compounds having a molecular weight of from more than 500 to 10,000 g/mol and at least 2 carboxyl or carboxylate groups in the molecule and which are obtainable by reacting dihydroxy compounds with tetracarboxylic dianhydrides in a molar ratio of from 2:1 to 1.05:1,
c) if required, polyhydroxy compounds which differ from (b) and have a molecular weight of from more than 500 to 5,000 g/mol,
d) if required, compounds having at least one group which is reactive toward isocyanate and at least one anionic group or group convertible into an anionic group and having a molecular weight of from 60 to 500 g/mol and
e) if required, compounds which differ from d) and e) and have at least 2 groups which are reactive toward isocyanate and a molecular weight of from 60 to 500 g/mol.

13 Claims, No Drawings

AQUEOUS POLYURETHANE DISPERSIONS

The present invention relates to aqueous dispersions containing a polyurethane which consists essentially of
a) organic polyisocyanates,
b) dihydroxy compounds having a molecular weight of from more than 500 to 10,000 g/mol and at least 2 carboxyl or carboxylate groups in the molecule and which are obtainable by reacting dihydroxy compounds with tetracarboxylic dianhydrides in a molar ratio of from 2:1 to 1.05:1,
c) if required, polyhydroxy compounds having a molecular weight of from more than 500 to 5,000 g/mol and containing no ionic groups or groups convertible into ionic groups,
d) if required, compounds having at least one group which is reactive toward isocyanate and at least one anionic group or group convertible into an anionic group and having a molecular weight of from 60 to 500 g/mol and
e) if required, compounds having at least 2 groups which are reactive toward isocyanate and a molecular weight of from 60 to 500 g/mol and containing no ionic groups or groups convertible into ionic groups.

Water-dispersible polyurethanes contain compounds having hydrophilic groups which ensure dispersibility. In particular, compounds having carboxyl groups and at least one group which is reactive toward isocyanate, ie. at least one primary or secondary amino or one hydroxyl group, are used as compounds having hydrophilic groups.

EP-A-18 665 discloses the use of reaction products of sterically hindered diols of not more than 18 carbon atoms and monoanhydrides of polycarboxylic acids having at least 3 carboxyl groups as hydrophilic compounds in polyurethanes which are modified with polyols based on fatty esters, in order to avoid secondary reactions.

DE-B-1 237 306 describes the reaction of polyurethane prepolymers with cyclic compounds which, after ring cleavage, have groups capable of salt formation.

According to DE-A-2 528 212, reaction products of polyols and dicarboxylic anhydrides can be used as hydrophilic compounds.

EP-A-171 relates to a process for the preparation of polyurethanes having carboxylate and amido groups. Here, tri- or tetracarboxylic monoanhydrides are reacted with polyols and some of the carboxyl groups still present are neutralized and some are reacted with isocyanate compounds with amide formation. Dihydroxy compounds as reaction products of tetracarboxylic dianhydrides with diols are not known from this publication.

The polyurethanes previously rendered hydrophilic with carboxyl-containing compounds still have unsatisfactory water resistance, in particular considerable swellability in water.

It is an object of the present invention to remedy this disadvantage.

We have found that this object is achieved by the aqueous polyurethane dispersions defined above and their use for the production of coatings and as adhesives.

Aliphatic, cycloaliphatic and aromatic diisocyanates are particularly suitable as polyisocyanates (a). Those of the general formula $X(NCO)_2$, where X is an aliphatic hydrocarbon radical of from 4 to 12 carbon atoms, a cycloaliphatic hydrocarbon radical of 6 to 15 carbon atoms or an aromatic hydrocarbon radical of 7 to 15 carbon atoms, are preferably used.

Suitable aliphatic, cycloaliphatic and aromatic diisocyanates are, for example, butane 1,4-diisocyanate, hexane 1,6-diisocyanate, 2,2,4- and 2,4,4-trimethylhexamethylene diisocyanate, cyclohexane diisocyanate, methylcyclohexane diisocyanate, isophorone diisocyanate, 4,4'-diisocyanatodiphenylmethane, 4,4'-diisocyanatodicyclohexylmethane and toluene 2,4- and 2,6-diisocyanate.

Mixtures of the diisocyanates may also be used. Mixtures of aliphatic or cycloaliphatic diisocyanates with aromatic diisocyanates in a molar ratio of from 1:4 to 5:1 have proven particularly suitable.

In addition to the diisocyanates, minor amounts of monoisocyanates can also be used for molecular weight regulation.

Particularly suitable polyhydroxy compounds ( c ) are dihydroxy compounds having a molecular weight of from more than 500 to 5,000, for example the known polyesters, polyethers, polythioethers, polylactones, polyacetals, polycarbonates and polyesteramides having 2 hydroxyl groups. Dihydroxy compounds whose molecular weight is from 750 to 3,000 are preferred. Mixtures of these dihydroxy compounds can of course also be used.

Suitable dihydroxy compounds b) have a molecular weight of from 500 to 10,000, in particular from 800 to 8,000, particularly preferably from 800 to 5,000, g/mol. They are obtainable by reacting the abovementioned dihydroxy compounds with tetracarboxylic dianhydrides in a molar ratio of from 2:1 to 1.05:1, preferably from 2:1 to 1.5:1. The tetracarboxylic diesters are formed in the reaction, cleavage of the anhydride rings taking place. There is essentially no reaction of the two remaining carboxyl groups with the dihydroxy compounds to give tri- or tetraesters. Starting from a molar ratio of 2 : 1, alternating units derived from dihydroxy compounds and tetracarboxylic dianhydrides are increasingly obtained in the reaction product on approaching a ratio of 1.05 : 1. Since the dihydroxy compounds are used in excess relative to the tetracarboxylic dianhydrides, the terminal units are, however, derived from the dihydroxy compounds so that in general a dihydroxy compound which contains 2 carboxyl groups per mol of incorporated tetracarboxylic anhydride unit is again formed.

The tetracarboxylic dianhydrides used may be aliphatic, cycloaliphatic or aromatic compounds. Examples are pyromellitic dianhydride, cyclopentanetetracarboxylic dianhydride, butanetetracarboxylic dianhydride, naphthalenetetracarboxylic dianhydride, benzophenonetetracarboxylic dianhydride and diphenylsulfonetetracarboxylic dianhydride.

The reaction between the dihydroxy compound and the tetracarboxylic dianhydride is preferably carried out at from 70° to 150° C, particularly preferably from 90° to 130° C., in the melt or in an inert solvent. The end of the reaction can be determined, for example, by virtue of the fact that an anhydride band is no longer detectable in the infrared spectrum. Examples of suitable solvents are methyl ethyl ketone, methyl isobutyl ketone, N-methylpyrrolidone and toluene.

The compounds d) are those having at least one group which is reactive toward isocyanate, ie. a hydroxyl or primary or secondary amino group, and an anionic group or group convertible into an anionic group. For example, aminocarboxylic acids or aminosulfonic acids, such as lysine, β-alanine or N-(2-aminoethyl)-2-aminoethanesulfonic acid, and the adducts, stated in DE-A-20 34 479, of aliphatic diprimary diamines with α-olefinic carboxylic acids, for example the adduct of ethylenediamine with acrylic acid, are noteworthy.

Dihydroxycarboxylic acids, in particular dihydroxyalkanecarboxylic acids of 3 to 10 carbon atoms, are preferably used. An example is 2,2-dimethylolpropionic acid.

For conversion of potential anionic groups of components b) and d), for example carboxyl groups or sulfo groups, into ionic groups, inorganic and/or organic bases, such as sodium hydroxide, potassium hydroxide, ammonia or tertiary amines, eg. triethylamine or dimethylaminopropanol, may be used.

For further increasing the water resistance, alkaline earth metal hydroxides, eg. Ca(OH)$_2$ or Ba(OH)$_2$, as a mixture with the abovementioned inorganic or organic bases may also be used.

The potentially anionic groups can be neutralized before or during dispersion of the polyurethane in water.

For example, monohydric polyetheralcohols having a molecular weight of from 500 to 10,000, preferably from 1,000 to 5,000, g/mol may be used as further emulsifying components. However, the addition of such nonionic emulsifiers is generally not necessary owing to the content of components b) and, where relevant, d).

Components (e) are conventional chain extenders, ie. essentially compounds which contain two hydroxyl groups, two primary or secondary amino groups or one hydroxyl and one primary or secondary amino group. Examples of suitable compounds are dihydroxy compounds, such as propane-1,3-diol or butane-1,4-diol, diamines, such as ethylenediamine, hexamethylenediamine, piperazine, 2,5-dimethylpiperazine, 1-amino-3-aminomethyl-3,5,5-trimethylcyclohexane (isophoronediamine), 4,4'-diaminodicyclohexylmethane, 2,4-diaminocyclohexane, 1,2-diaminopropane or hydrazine, or amino alcohols, such as ethanolamine, isopropanolamine, methylethanolamine or aminoethoxyethanol. Components e), which contain more than two functional groups which are reactive toward isocyanate, may also be used, in which case the compounds e) also act as crosslinking agents.

The amounts of components a) to e) are chosen in particular so that the sum of functional groups which are reactive toward isocyanate, ie. of the hydroxyl or primary or secondary amino groups, is from 0.8 to 1.2, preferably from 0.95 to 1.05, gram equivalents per gram equivalent of isocyanate.

Particularly preferably, the number of functional groups which are reactive toward isocyanate corresponds to the number of isocyanate groups.

The amount of the individual components, based on 1 gram equivalent of isocyanate, is in particular 0.01–0.8, preferably 0.05–0.7, gram equivalent of components b), 0–0.8, preferably 0–0.4, grain equivalent of components c), 0–0.4, preferably 0–0.2, gram equivalent of components d) and 0–0.9, preferably 0.05–0.8, gram equivalent of components e).

The polyurethane need not contain components d) if the amount of components b) is sufficiently high to ensure dispersibility.

For the preparation of the polyurethane, components (a) to (e) can be reacted in a low boiling, water-miscible organic solvent in a conventional manner, as also described in, for example, DE-A-34 37 918.

Examples of preferred solvents are tetrahydrofuran, methyl ethyl ketone, N-methylpyrrolidone and in particular acetone.

The reaction temperature is preferably from 50° to 100° C.

Conventional and known catalysts, such as dibutyltin dilaurate, tin(II) octoate or 1,4-diazabicyclo[2.2.2]octane, may be present for accelerating the reaction of the diisocyanates.

The polyurethane obtained is then dispersed in water, and the organic solvent is removed to the required extent, generally completely, by distillation.

The polyurethane can also be prepared by a procedure in which a polyurethane prepolymer is first prepared in the low boiling water-miscible organic solvent. In particular, at least components (a) and (b) and, if required, (c) and, if necessary, portions of components d) and e) are reacted with one another for this purpose. The resulting polyurethane prepolymer is then dispersed in water. The further reaction can then be carried out in particular with the components or the remaining portions of components d) and e). The organic solvent can then be removed, as described above.

The solids content of the resulting aqueous polyurethane dispersion is preferably from 20 to 80, particularly preferably from 30 to 70, % by weight.

The novel dispersions can be used for the production of coatings, for example finishes or protective coatings, or as adhesives.

They are also particularly suitable for coating leather or synthetic or nonsynthetic textiles, e.g. polyamide, polyester, wool or cotton textiles.

They may contain further components customary for the particular use.

Tackifiers, for example phenol/formaldehyde resins or epoxy resins, are also particularly suitable for the use as adhesives.

In connection with the use for the production of coatings, for example, fillers, dyes, pigments and leveling agents may be mentioned.

The coatings or adhesive bonds produced using the dispersions possess in particular low swellability in water.

EXAMPLES

| Abbreviations | |
| --- | --- |
| IPDA: | Isophoronediamine |
| IPDI: | Isophorone diisocyanate |
| DETA: | Diethylenetriamine |
| HDI: | Hexamethylene diisocyanate |
| TDI: | Toluylene diisocyanate |
| MDI: | Diphenylmethane diisocyanate |
| PTHF: | Polytetrahydrofuran |
| MEK: | Methyl ethyl ketone |
| DMEA: | Dimethylethanolamine |
| DMPA: | Dimethylolpropionic acid |
| DETA: | Diethanolamine |

The size of the latex particles was determined indirectly via turbidity measurements. For this purpose, the turbidity of a dispersion having a solids content of 0.01% was determined relative to distilled water in a layer thickness of 2.5 cm and at room temperature.

$$LT = \frac{Intensity_{Disp.} \times 100}{Intensity_{Water}}$$

For the determination of the water absorption, 50 g of each dispersion were dried at 40° C. for 3 days to give films.

The films were then stored for 24 hours at room temperature in water, and the water absorption was determined from the increase in weight.

EXAMPLE 1

In a stirred apparatus provided with a stirrer, a thermometer and a reflux condenser, 402 g of PTHF (molecular weight 2,000) was stirred with 18.9 g (0.09 mol) of cyclopentanetetracarboxylic dianhydride and 100 g of MEK at 90° C. until the mixture became clear. 55.06 g of butane-1,4-diol and 185.8 g (0.835 mol) of IPDI were added at room temperature and the mixture was heated for 2 h 15 min at 90° C. The NCO content was 1.37% by weight. The mixture was diluted with 500 g of acetone and cooled to 30° C. Thereafter, 12.9 g of dimethylethanolamine, 1200 g of water and, immediately thereafter, 8.6 g of diethanolamine in 50 g of water were added. The solvent was distilled off at 85 mbar and 40° C. Solids content: 35.6% by weight; LT=95 Water absorption: 10.5% by weight

EXAMPLE 2

386.8 g of polyester of 1 : 1 adipic acid/isophthalic acid and hexanediol, having a molecular weight of 2,000, was stirred with 25.2 g (0.12 mol) of cyclopentanetetracarboxylic dianhydride and 100 g of MEK at 90° C. until a clear mixture was obtained. The mixture was then cooled to room temperature and 72.1 g of butane-1,4-diol and, at 35° C., 223.6 g (1.005 mol) of isophorone diisocyanate were added. The mixture was stirred for 3 h 45 min at 70° C. and diluted with 600 g of acetone. After the addition of 17.2 g of dimethylethanolamine, stirring was carried out briefly and 1,200 g of water and then 8.6 g of DETA in 50 g of water were added. The solvent was distilled off at 129 mbar and 45° C. Solids content: 36.7% by weight; LT=74 Water absorption: 6.8% by weight

EXAMPLE 3

397.8 g (0.2 mol) of PTHF having an OH number of 56.4 and 21.8 g (0.1 mol) of pyromellitic dianhydride were heated at 120° C. for 2 hours. 54.06 g of butane-1,4-diol were then added at this temperature and, after 30 L5 minutes, the mixture was cooled to room temperature. After the addition of 120 g of MEK, 183.56 g (0.825 mol) of IPDI and 0.1 ml of dibutyltin dilaurate, stirring was continued for a further 3 h 20 min at 70° C. and the mixture was diluted with 600 g of acetone. At 30° C., 12.48 g of DMEA and 1,400 g of water were added, followed by 8.6 g of DETA in 50 g of water.

The solvent was distilled off at 80 mbar and 40° C. Solids content: 34.2% by weight; LT=96 Water absorption: 17.7% by weight

COMPARATIVE EXAMPLE 1 (for Example 1)

401 g of PTHF (MW=2,000 g/mol), 26.8 g (0.2 mol) of dimethylolpropionic acid, 54.06 g of butane-1,4-diol and 100 g of MEK were initially taken, and 250.3 g (1.12 mol) of IPDI and 0.1 ml of dibutyltin dilaurate as a catalyst were added. The reaction was carried out at 90° C. for 6 h 20 min and dilution was then effected with 500 g of acetone. The NCO value was 0.72%. At 30° C., 14.26 g of dimethylethanolamine and 1,400 g of water were then added, followed by 8.6 g of diethanolamine (DETA) in 50 g of water.

The solvent was distilled off at 84 mbar and 40° C. Solids content: 36.4% by weight; LT=98 Water absorption: 17.7% by weight

COMPARATIVE EXAMPLE 2 (for Example 2)

386.8 g of the polyester from Example 2 were initially taken with 36.18 g (0.27 mol) of DMPA, 72.08 g of butane-1,4-diol and 100 g of MEK, and 310.39 g (1.395 mol) of IPDI and 0.1 ml of dibutyltin dilaurate were added. The stirred mixture was kept at 90° C. for 3 h 30 min and then diluted with 600 g of acetone. The NCO value was 0.69%. At 30° C., 19.25 g of DMEA and 1,300 g of water were added, followed immediately afterward by 8.6 g of DETA in 50 g of water.

The solvent was distilled off at 90 mbar and 40° C. Solids content: 40.6% by weight; LT=98 Water absorption: 74% by weight

COMPARATIVE EXAMPLE 3 (for Example 3)

397.8 g of PTHF (molecular weight 2,000 g/mol) from Example 3, 22.78 g (0.17 mol) of DMPA, 36.04 g of butane-1,4-diol, 100 g of MEK, 199.14 g (0.895 mol) of IPDI and 0.1 ml of dibutyltin dilaurate were reacted for 3 hours at 90° C. to an NCO value of 1.36%, and the mixture was diluted with 740 g of acetone. At 30° C, 12.12 g of DMEA and 1,690 g of water were added, followed by 8.6 g of DETA in 50 g of water.

The solvent was distilled off at 88 mbar and 40° C. Solids content: 28.8% by weight; LT=94 Water absorption: 44.5% by weight

We claim:

1. An aqueous dispersion containing a polyurethane which consists essentially of:
   (a) organic polyisocyanates,
   (b) dihydroxy compounds having a molecular weight of from more than 500 to 10,000 g/mol and at least 2 carboxyl or carboxylate groups in the molecule which are obtained by reacting dihydroxy compounds having a molecular weight of from more than 500 to 5,000 with tetracarboxylic dianhydrides in a molar ration of from 2:1 to 1.05:1;
   (c) optionally, polyhydroxy compounds having a molecular weight of from more than 500 to 5,000 g/mol and containing no ionic groups or groups convertible into ionic groups:
   (d) optionally, compounds having at least one group which is reactive toward isocyanate and at least one anionic group or group convertible into an anionic group and having a molecular weight of from 60 to 500 g/mol; and
   (e) optionally, compounds having at least two groups which are reactive toward isocyanate and a molecular weight of from 60 to 500 g/mol and containing no ionic groups or groups convertible into ionic groups.

2. The aqueous dispersion of claim 1, wherein the dihydroxy compounds which react with tetracarboxylic dianhydrides in the preparation of component (b) have a molecular weight ranging from 750 to 3,000.

3. The aqueous dispersion of claim 1, wherein said dihydroxy compounds which react with said tetracarboxcylic dianhydrides are polyesters, polyethers, polythioethers, polylactones, polyacetals, polycarbonates and polyester amides each having two hydroxyl groups.

4. The aqueous dispersion of claim 1, wherein said dihydroxy compound (b) has a molecular weight ranging from 800 to 8,000 g/mol.

5. The aqueous dispersion of claim 1, wherein said tetracarboxylic dianhydride is pyromellitic dianhydride, cyclopentanetetracarboxylic dianhydride, butanetetracarboxylic dianhydride, naphtalenetetracarboxylic dianhydride, benzophenonetetracarboxylic dianhydride or diphenylsulfonetetracarboxylic dianhydride.

6. The aqueous dispersion of claim 1, wherein the molar ratio of dihydroxy compound to tetracarboxylic dianhydride ranges from 2:1 to 1.5:1.

7. An article coated with the dispersion as claimed in claims 1

8. A polyurethane which comprises the reaction product of:
   (a) organic polyisocyanates,
   (b) dihydroxy compounds having a molecular weight of from more than 5090 to 10,000 g/mol and at least 2 carboxyl or carboxylate groups in the molecule which are obtained by reacting dihydroxy compounds having a molecular weight of form more than 500 to 5,000 with tetracarboxylic dianhydrides in a molar ratio of from 2:1 to 1.05:1;
   (c) optionally, polyhydroxy compounds having a molecular weight of from more than 500 to 5,000 g/mol and containing no ionic groups or groups convertible into ionic groups:
   (d) optionally, compounds having at least one group which is reactive toward isocyanate and at least one anionic group or group convertible into an anionic group and having a molecular weight of from 60 to 500 g/mol; and
   (e) optionally, compounds having at least two groups which are reactive toward isocyanate and a molecular weight of from 60 to 500 g/mol and containing no ionic groups or groups convertible into ionic groups.

9. The polyurethane of claim 8, wherein the dihydroxy compounds which react with tetracarboxylic dianhydrides in the preparation of component (b) have a molecular weight ranging from 750 to 3,000.

10. The polyurethane of claim 8, wherein said dihydroxy compounds which react with said tetracarboxylic dianhydrides are polyesters, polyethers, polythioethers, polylactones, polyacetals, polycarbonates and polyester amides each having two hydroxyl groups.

11. The polyurethane of claim 8, wherein said dihydroxy compound (B) has a molecular weight ranging from 800 to 8,000 g/mol.

12. The polyurethane of claim 8, wherein said tetracarboxylic dianhydride is pyromellitic dianhydride, cyclopentanetetracarboxylic dianhydride, butanetetracarboxylic dianhydride, naphthalenetetracarboxylic dianhydride, benzophenonetetracarboxylic dianhydride or diphenylsulfone tetracarboxylic dianhydride.

13. The polyurethane of claim 8, wherein the molar ratio of dihydroxy compound to tetracarboxcylic dianhydride ranges from 2:1 to 1.5:1.

* * * * *

UNITED STATES PATENT AND TRADEMARK OFFICE
CERTIFICATE OF CORRECTION

PATENT NO. : 5,342,915
DATED : August 30, 1994
INVENTOR(S) : Ulrike LICHT, et al.

It is certified that error appears in the above-indentified patent and that said Letters Patent is hereby corrected as shown below:

On the title page, Item [75], the fourth inventor's city should read:
--Duerkheim--

Signed and Sealed this

Sixth Day of December, 1994

Attest:

BRUCE LEHMAN

Attesting Officer     Commissioner of Patents and Trademarks